(12) United States Patent
Rowitch et al.

(10) Patent No.: US 8,473,205 B2
(45) Date of Patent: Jun. 25, 2013

(54) PROCEDURE FOR SEARCHING FOR POSITION DETERMINATION SIGNALS USING A PLURALITY OF SEARCH MODES

(75) Inventors: Douglas N. Rowitch, Del Mar, CA (US); Christopher Patrick, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 938 days.

(21) Appl. No.: 11/004,313

(22) Filed: Dec. 2, 2004

(65) Prior Publication Data
US 2005/0101272 A1    May 12, 2005

Related U.S. Application Data

(62) Division of application No. 10/278,694, filed on Oct. 22, 2002, now Pat. No. 6,873,910.

(51) Int. Cl.
*G01C 21/00* (2006.01)
(52) U.S. Cl.
USPC .......................... 701/468; 701/408; 701/469
(58) Field of Classification Search
USPC .................... 701/213, 207, 214; 342/357.12, 342/357.2, 357.49, 429
See application file for complete search history.

(56) References Cited

U.S. PATENT DOCUMENTS

| | | | |
|---|---|---|---|
| 4,445,118 A | 4/1984 | Taylor et al. | |
| 5,228,062 A | 7/1993 | Bingham | |
| 5,323,164 A | 6/1994 | Endo | |
| 5,485,224 A | 1/1996 | Burns et al. | |
| 5,500,648 A | 3/1996 | Maine et al. | |
| 5,692,008 A | 11/1997 | Van Nee | |
| 5,774,601 A | 6/1998 | Mahmoodi | |
| 5,917,444 A | 6/1999 | Loomis et al. | |
| 5,982,811 A | 11/1999 | Harrison et al. | |
| 5,995,042 A | 11/1999 | Durboraw, III | |
| 5,999,561 A | 12/1999 | Naden et al. | |

(Continued)

FOREIGN PATENT DOCUMENTS

| | | |
|---|---|---|
| EP | 0092027 | 10/1983 |
| EP | 0635728 A1 | 1/1995 |

(Continued)

OTHER PUBLICATIONS

International Search Report—PCT/US03/033660, International Search Authority—European Patent Office, Apr. 3, 2004.

(Continued)

*Primary Examiner* — Khoi Tran
*Assistant Examiner* — Jorge Peche
(74) *Attorney, Agent, or Firm* — Howard Seo

(57) ABSTRACT

A method of and system for searching for position determination signals using a plurality of progressively more sensitive search modes comprising a first level mode, a second mode, and at least one higher level mode. If any of the search window parameters exceed prescribed limits, a first level search is performed, and the search window parameters are refined responsive to the ensuing search results so they are within the prescribed limits. Then, the second level search is performed, and measurements derived from the ensuing search results. If the measurements satisfy selected measurement sufficiency criteria, additional searching within the position fix attempt is avoided. If the measurements do not satisfy the selected measurement sufficiency criteria, a higher level, more sensitive search is performed.

26 Claims, 15 Drawing Sheets

U.S. PATENT DOCUMENTS

| | | | |
|---|---|---|---|
| 6,047,017 A | 4/2000 | Cahn et al. | |
| 6,113,653 A | 9/2000 | Ashley et al. | |
| 6,133,873 A | 10/2000 | Krasner | |
| 6,201,828 B1 | 3/2001 | El-Tarhuni et al. | |
| 6,208,291 B1 | 3/2001 | Krasner | |
| 6,236,354 B1 | 5/2001 | Krasner | |
| 6,278,403 B1* | 8/2001 | Peng et al. | 342/357.77 |
| 6,313,786 B1 | 11/2001 | Sheynblat et al. | |
| 6,324,474 B1 | 11/2001 | Beisner et al. | |
| 6,366,599 B1* | 4/2002 | Carlson et al. | 375/130 |
| 6,437,734 B1* | 8/2002 | McBurney et al. | 342/357.62 |
| 6,448,925 B1 | 9/2002 | Shridhara | |
| 6,452,545 B2 | 9/2002 | Araki et al. | |
| 6,480,150 B2* | 11/2002 | Falk et al. | 342/357.77 |
| 6,535,163 B1 | 3/2003 | Sahai et al. | |
| 6,597,733 B2 | 7/2003 | Pollmann et al. | |
| 6,606,346 B2 | 8/2003 | Abraham et al. | |
| 6,614,244 B2 | 9/2003 | Yamada et al. | |
| 6,614,834 B1 | 9/2003 | Meng et al. | |
| 6,649,862 B2 | 11/2003 | Verzeletti | |
| 6,665,333 B2 | 12/2003 | McCrady et al. | |
| 6,680,695 B2 | 1/2004 | Turetzky et al. | |
| 6,707,422 B2 | 3/2004 | Sheynblat et al. | |
| 6,738,015 B1 | 5/2004 | Linhart et al. | |
| 6,792,035 B2 | 9/2004 | Kontola | |
| 6,795,019 B2 | 9/2004 | Holt | |
| 6,795,490 B2 | 9/2004 | Belotserkovsky | |
| 6,825,805 B2 | 11/2004 | Rowitch | |
| 6,873,910 B2 | 3/2005 | Rowitch et al. | |
| 6,898,492 B2* | 5/2005 | de Leon et al. | 701/35 |
| 6,987,820 B1 | 1/2006 | Brenner | |
| 7,006,790 B2* | 2/2006 | Bloebaum et al. | 455/13.2 |
| 7,089,115 B2 | 8/2006 | Chapman et al. | |
| 7,095,370 B1* | 8/2006 | van Diggelen et al. | 342/357.61 |
| 7,096,132 B2 | 8/2006 | Patrick et al. | |
| 7,127,011 B2 | 10/2006 | Rowitch | |
| 7,256,732 B2 | 8/2007 | De Salas et al. | |
| 7,656,348 B2 | 2/2010 | Ahmed et al. | |
| 7,978,131 B2 | 7/2011 | Ahmed et al. | |
| 2001/0048388 A1* | 12/2001 | Falk et al. | 342/357.12 |
| 2002/0005802 A1 | 1/2002 | Bryant et al. | |
| 2002/0024463 A1 | 2/2002 | Turetzky et al. | |
| 2002/0154688 A1 | 10/2002 | Pollmann et al. | |
| 2002/0175856 A1* | 11/2002 | van Diggelen | 342/357.09 |
| 2003/0008622 A1 | 1/2003 | Fernandez-Corbaton et al. | |
| 2003/0025631 A1 | 2/2003 | Kim | |
| 2003/0083816 A1* | 5/2003 | Imakado et al. | 701/213 |
| 2003/0151547 A1 | 8/2003 | Mauro et al. | |
| 2003/0156665 A1 | 8/2003 | Sahai et al. | |
| 2003/0157892 A1* | 8/2003 | Reznik et al. | 455/65 |
| 2003/0176969 A1* | 9/2003 | van Diggelen | 701/213 |
| 2003/0236620 A1* | 12/2003 | van Diggelen et al. | 701/213 |
| 2004/0043726 A1 | 3/2004 | Rowitch | |
| 2004/0120387 A1 | 6/2004 | Bultan et al. | |
| 2004/0176099 A1 | 9/2004 | Sahai et al. | |
| 2005/0055160 A1* | 3/2005 | King | 701/213 |
| 2005/0099334 A1* | 5/2005 | Roh | 342/357.12 |
| 2006/0271293 A1* | 11/2006 | van Diggelen | 701/213 |

FOREIGN PATENT DOCUMENTS

| | | |
|---|---|---|
| EP | 1170597 | 7/2007 |
| JP | 63106581 | 5/1988 |
| JP | 5281330 A | 10/1993 |
| JP | 8037471 A | 2/1996 |
| JP | 8293852 | 11/1996 |
| JP | 2000249754 A | 9/2000 |
| JP | 2001008907 | 1/2001 |
| JP | 2001318136 A | 11/2001 |
| JP | 2002500751 A | 1/2002 |
| JP | 2003506930 A | 2/2003 |
| JP | 2003514215 A | 4/2003 |
| JP | 2005241584 A | 9/2005 |
| JP | 2005526257 A | 9/2005 |
| JP | 2006506830 A | 2/2006 |
| RU | 2082279 | 6/1997 |
| RU | 2178894 | 1/2002 |
| WO | WO0045191 A2 | 8/2000 |
| WO | WO0077538 A1 | 12/2000 |
| WO | WO 02/059639 * | 7/2002 |
| WO | WO02059639 A1 | 8/2002 |

OTHER PUBLICATIONS

Kaplan et al., "Understanding GPS: Principles and Applications", 1996, pp. 83-236, Artech House, Massachusetts, USA.

Reznik et al., "Rake finger location and relocation" U.S. Appl. No. 60/356,231.

Sairo H et al: "Weighted dilution of precision as quality measure in satellite positioning" IEE Proceedings: Radar, Sonar & Navigation, Institution of Electrical Engineers, GBLNKD—DOI:IO.I049IIP-RSN:20031008, vol. 150, No. 6, Dec. 1, 2003, pp. 430-436, XP006024348.

Barry A. Stein, "Satellite Selection Criteria During Altimater Aiding of GPS", Navigation, Institute of Navigation, Washington D.C., vol. 32, No. 2, Jun. 1985.

Lai, et al., "Interpolation Method for Time Delay Estimation in the RF-signal Crosscorrelation Technique for Blood Velocity Measurement", Ultrasonics Symposium, 1996, pp. 1211-1215.

PW. Ward, "GPS receiver search techniques", IEEE Position Location and Navigation Symposium, pp. 604-611, Apr. 1996.

Sairo H et al., "Integrity Measure for Assisted GPS Based on Weighted Dilution of Precision", Proceedings of the 15th International Technical Meeting of the Satellite Division of the Institute of Navigation (ION GPS 2002), Sep. 24, 2002, p. 2602-2609.

* cited by examiner

| Search Mode | Freq Search Space (Hz) | Num Freq Bins | Num Code Bins (cx2) | Coh Integ Time (ms) | Non-Coh Integ | Total Integ Time (ms) | Detect Thresh C/No (dB-Hz) | Sensitivity C/No (dB-Hz) |
|---|---|---|---|---|---|---|---|---|
| 0 | ±250 | 20 | 64 | 20 | 1 | 20 | 29.8 | 31.0 |
| 1 | ±250 | 20 | 64 | 20 | 4 | 80 | 25.0 | 26.4 |
| 2 | ±250 | 20 | 64 | 20 | 44 | 880 | 18.1 | 19.2 |
| 3 | ±62.5 | 20 | 64 | 80 | 22 | 1760 | 14.0 | 15.45 |

FIGURE 11

PROCEDURE FOR SEARCHING FOR POSITION DETERMINATION SIGNALS USING A PLURALITY OF SEARCH MODES

RELATED APPLICATIONS

This application is a divisional U.S. patent application Ser. No. 10/278,694, filed on Oct. 22, 2002 now U.S. Pat. No. 6,873,910.

FIELD OF THE INVENTION

This invention relates to the fields of position determination and GPS geo-location systems, and, more specifically, to procedures for searching for position determination signals using search modes with varying sensitivity and time to fix.

RELATED ART

The GPS geo-location system is a system of earth orbiting satellites from which entities visible to the satellites are able to determine their position. Each of the satellites transmits a signal marked with a repeating pseudo-random noise (PN) code of 1,023 chips uniquely identifying the satellite. The 1,023 chips repeat every millisecond. The signal is also modulated with data bits, where each data bit has a 20 ms duration in the modulated signal.

FIG. 1 illustrates an application of the GPS geo-location system, whereby a subscriber station 100 in a wireless communications system receives transmissions from satellites 102a, 102b, 102c, 102d visible to the station, and derives time measurements from four or more of the transmissions. The station provides the measurements to position determination entity (PDE) 104, which determines the position of the station from the measurements. Alternatively, the subscriber station 100 may determine its own position from this information.

The subscriber station 100 searches for a transmission from a particular satellite by correlating the PN code for the satellite with a received signal. The received signal is typically is a composite of transmissions from one or more satellites visible to the station's receiver in the presence of noise. The correlation is performed over a range of code phase hypotheses known as the code phase search window $W_{CP}$, and over a range of Doppler frequency hypotheses known as the Doppler search window $W_{DOPP}$. The code phase hypotheses are typically represented as a range of PN code shifts, and the Doppler frequency hypotheses are typically represented as Doppler frequency bins.

Each correlation is performed over an integration time I which may be expressed as the product of $N_c$ and M, where $N_c$ is the coherent integration time, and M is number of coherent integrations which are non-coherently combined.

For a particular PN code, the correlation values are associated with the corresponding PN code shifts and Doppler bins to define a two-dimensional correlation function. Any peaks of the correlation function are located, and compared to a predetermined noise threshold. The threshold is selected so that the false alarm probability, the probability of falsely detecting a satellite transmission, is at or below a predetermined value. A time measurement for the satellite is derived from the location of the earliest non-sidelobe peak along the code phase dimension which equals or exceeds the threshold. A Doppler measurement for the subscriber station may be derived from the location of the earliest non-sidelobe peak along the Doppler frequency dimension which equals or exceeds the threshold.

Current subscriber station architectures place significant constraints on the process of searching for position determination signals. In a shared RF architecture, for example, core RF circuitry in the subscriber station is shared between the GPS position determination receive path and the voice/data communication transmit and receive paths. Accordingly, the time during which the subscriber station performs the GPS position determination function interferes with the ability of the subscriber station to perform the voice/data communication function. To reduce this interference to acceptable levels, the GPS frequency tune time, i.e., the time during which the subscriber station is tuned to the GPS frequency to perform the GPS position determination function, is typically limited to a prescribed period, e.g., 1 or 2 seconds.

Due to constraints such as this, and the wide dynamic range typically exhibited by GPS position determination signals, it is difficult to perform the search for position determination signals in the allotted time and still achieve an accurate position fix. If the search is performed within the prescribed time period, the resulting position fix is often inaccurate. If the search fix is performed accurately, the allotted time if often exceeded.

SUMMARY OF THE INVENTION

A method is described of searching for position determination signals using a plurality of progressively more sensitive search modes. In a first embodiment, the plurality of search modes comprises, in order of increasing sensitivity, a first level mode, a second level mode, and at least one higher level mode. In this embodiment, the method begins by determining whether any of the search window parameters exceed prescribed limits. If so, a first level search is performed, and the search window parameters are refined based on the resulting search results so that they are within the prescribed limits. If none of the search window parameters exceed the prescribed limits, the first level search is avoided.

A second level search is then performed as part of a position fix attempt. Measurements are derived from the ensuing search results. If the measurements satisfy one or more selected measurement sufficiency criteria, additional searching within the position fix attempt is avoided.

If the measurements do not satisfy the one or more selected measurement sufficiency criteria, a higher level search beyond the second level is conducted. In one embodiment, a selection is made between a third level and a fourth level search based on prescribed selection criteria. In one implementation, if the criteria are satisfied, the third level search is conducted, and if the criteria are not satisfied, the fourth level search is conducted.

In a second embodiment, the plurality of search modes comprises, in order of increasing sensitivity, a first level mode, a second level mode, and a third level mode. In this embodiment, the method begins by performing a first level search as part of a position fix attempt.

Then, one or more measurements are derived from the ensuing search results. It is determined whether the measurements satisfy one or more selected measurement sufficiency criteria.

If the measurements satisfy the one or more selected measurement sufficiency criteria, additional searching within the position fix attempt is avoided.

If the measurements do not satisfy the one or more selected measurement sufficiency criteria, a higher level search beyond the first level is performed. In this embodiment, the higher level search is either a second level or a third level search based on one or more prescribed selection criteria.

Memories tangibly embodying the foregoing methods are also described. Similarly, systems related to the foregoing methods are described.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 11 is a table identifying the parameters governing the level 0, level 1, level 2, and level 3 search modes in the implementation example of FIG. 4.

DETAILED DESCRIPTION

As utilized herein, terms such as "about" and "substantially" are intended to allow some leeway in mathematical exactness to account for tolerances that are acceptable in the trade. Accordingly, any deviations upward or downward from the value modified by the terms "about" or "substantially" in the range of 1% to 20% should be considered to be explicitly within the scope of the stated value.

Moreover, as used herein, the term "software" includes source code, assembly language code, binary code, firmware, macro-instructions, micro-instructions, or the like, or any combination of two or more of the foregoing.

Furthermore, the term "memory" refers to any processor-readable medium, including but not limited to RAM, ROM, EPROM, PROM, EEPROM, disk, floppy disk, hard disk, CD-ROM, DVD, or the like, or any combination of two or more of the foregoing, on which may be stored a series of software instructions executable by a processor.

The terms "processor" or "CPU" refer to any device capable of executing a series of instructions and includes, without limitation, a general- or special-purpose microprocessor, finite state machine, controller, computer, digital signal processor (DSP), or the like.

The term "space vehicle" and the abbreviation "SV" both mean a GPS satellite.

Figure 1:
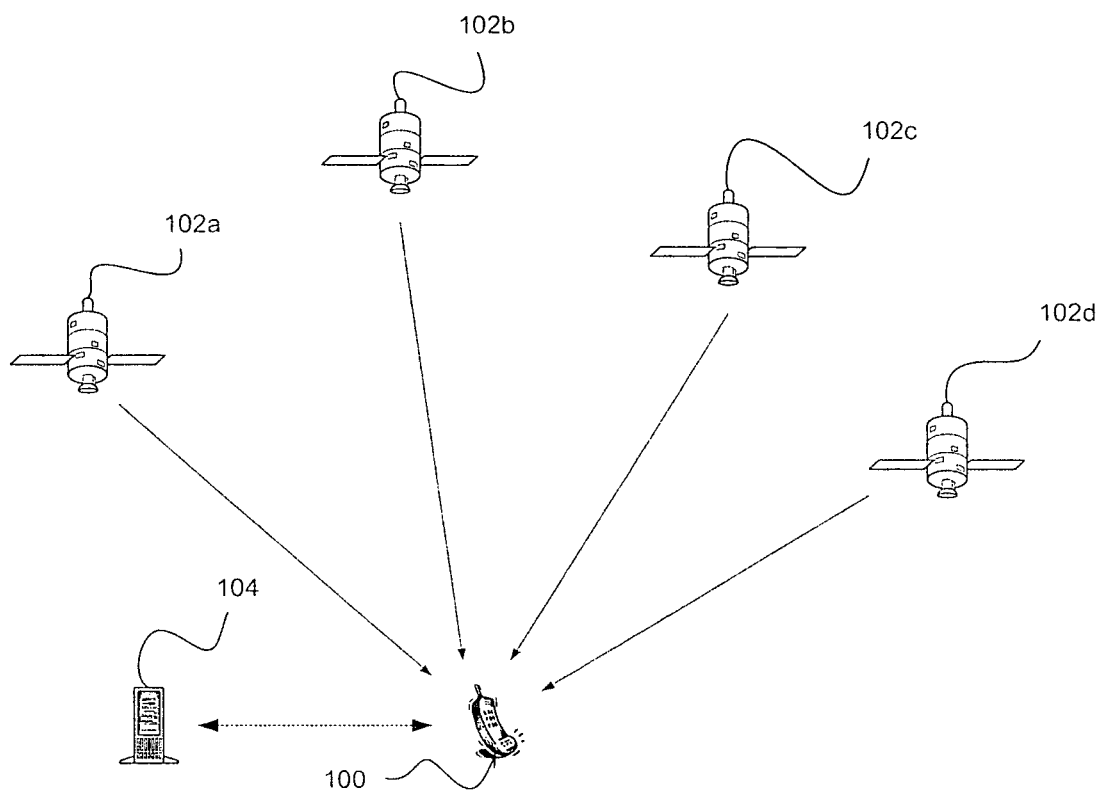
FIG. 1 is a diagram of a GPS geo-location system.
Figure 2:
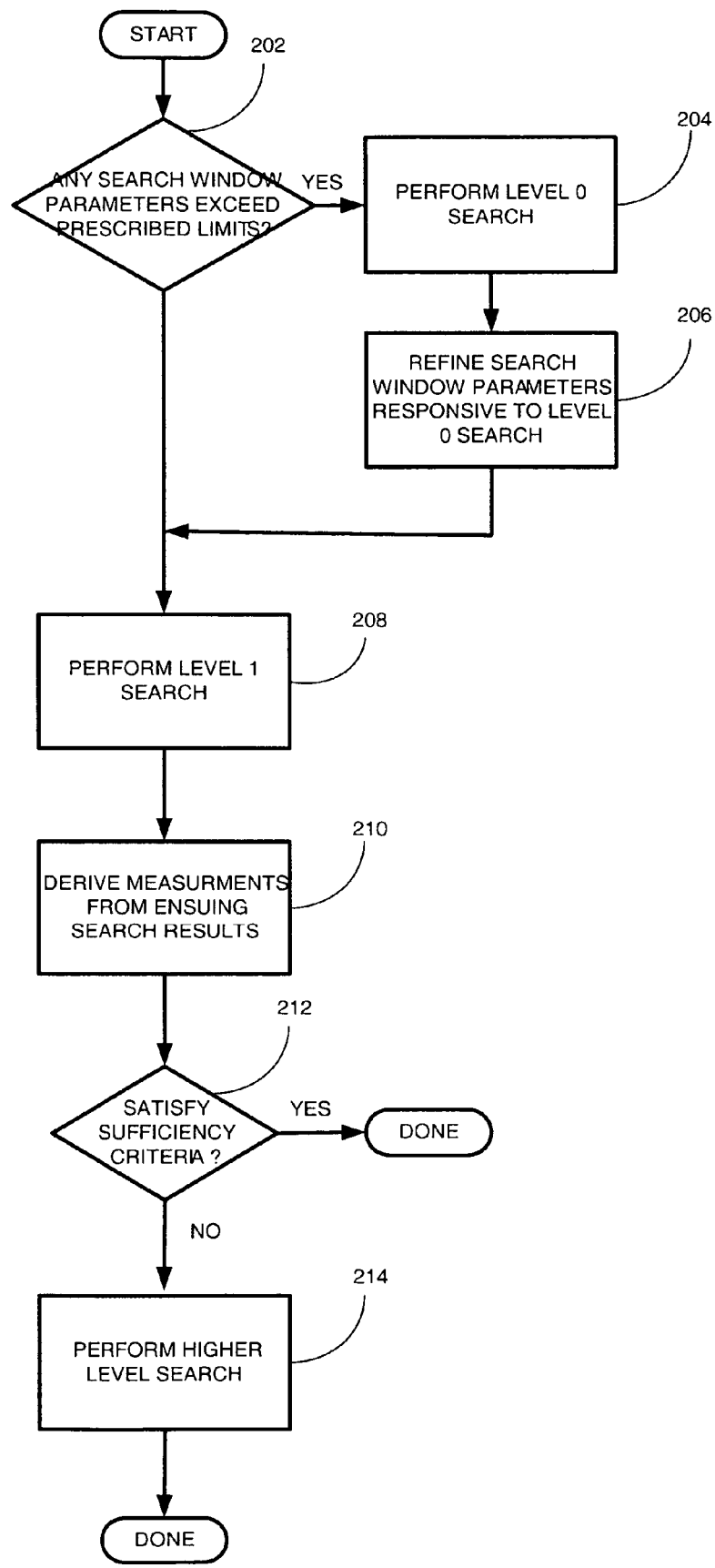
FIG. 2 is a flowchart of an embodiment of a method according to the invention of searching for position determination signals using a plurality of progressively more sensitive search modes.

FIG. 2 is a flowchart of an embodiment of a method according to the invention of searching for position determination signals using a plurality of progressively more sensitive search modes comprising, in order of increasing sensitivity, a level 0 mode, a level 1 mode, and at least one higher level mode. This particular embodiment, and the related implementation illustrated in FIGS. 4-10, grew out of the timing constraints imposed by a shared RF architecture on the time during which the subscriber station is allowed to tune to the GPS frequency, but it should be appreciated that the invention is not limited to this, and encompasses applications to dual RF (non-shared) architectures which do not impose such constraints.

In one example, the method is performed by an entity whose position is sought to be determined, such as a subscriber station in an IS-801 compliant wireless communications system. A PDE provides to the subscriber station acquisition assistance (AA) indicating which SVs are likely to be visible to the station. These SVs form a set $N_{TOT}$. In a second example, AA is unavailable, and the set $N_{TOT}$ consists of all SVs in the GPS geo-location system. In a third example, the subscriber station has access to a recent almanac as well as an approximate measure of time and coarse knowledge of its own position. From this information, the subscriber station predicts which SVs are visible to it. These SVs form the set $N_{TOT}$ in this example.

Each of the SVs in the set $N_{TOT}$ is associated with search window parameters defining the two-dimensional domain of code phase and Doppler frequency hypotheses to be searched for the SV. In one implementation, illustrated in FIG. 12A, the search window parameters for an SV comprise a code phase search window size, $WIN\_SIZE_{CP}$, a code phase window center, $WIN\_CENT_{CP}$, a Doppler search window size, $WIN\_SIZE_{DOPP}$, and a Doppler window center, $WIN\_SIZE_{DOPP}$. In the case where the entity whose position is sought to be determined is a subscriber station in an IS-801 compliant wireless communication system, these parameters are indicated by acquisition assistance provided to the subscriber station by the PDE.

The method begins with step 202, which comprises determining whether any of the search window parameters exceed prescribed limits. In one embodiment, step 202 comprises determining whether any of the search windows for an SV in the set $N_{TOT}$ exceed prescribed size limits. That might occur, for example, if a new base station is added to a network without being added to the PDE base station almanac. A PDE in this situation providing AA to subscriber stations serviced by the base station sets the code phase search window size for all SVs to the maximum value of 1,023 chips. A code phase search window of this magnitude might cause a time out condition during the level 1 search. The purpose of step 202 in this example is to determine which, if any, of the SVs are associated with search windows that could cause a time out condition.

If any of the search window parameters exceed prescribed limits, step 204 is performed. Step 204 comprises performing a level 0 search. In one example, the level 0 search is performed only for those SVs in the set $N_{TOT}$ whose code phase search window size exceeds a predetermined threshold.

Step 206 follows step 204. In step 206, the search window parameters are refined based on the ensuing search results so that they are within the prescribed limits. In one example, where only the SVs whose code phase window sizes exceed a predetermined threshold are searched, this step comprises locating the maximum peak for a given PN code, modifying the window center so it is located at the peak, and reducing the window size so a search for the SV can be accommodated through a single pass through the correlator. This step may also involve re-centering and reducing the size of the Doppler frequency search window.

From step 206, the method performs step 208, which comprises conducting a level 1 search as part of a position fix attempt. The level 1 search is a more sensitive search compared to the level 0 search. Accordingly, in one implementation, the integration time used to conduct this search exceeds that of the level 0 search.

From step 208, the method proceeds to step 210. In step 210, measurements are derived from the ensuing search results. In one example, the measurements comprise a signal to noise ratio (SNR) and code phase (time) for each of the discernable peaks. In one implementation example, the SNR which is derived is the peak carrier signal to noise ratio ($C/N_0$).

From step 210, the method proceeds to inquiry step 212. In step 212, it is determined whether the measurements resulting from the level 1 search satisfy one or more selected measurement sufficiency criteria. If the measurements satisfy the one or more selected measurement sufficiency criteria, additional searching within the position fix attempt is avoided.

If the measurements do not satisfy the one or more selected measurement sufficiency criteria, step 214 is performed. In step 214, a higher level search for position determination signals is performed. The higher level search is a more sensitive search than the level 1 search. Accordingly, the integration time employed in this search is longer than that employed in the level 1 search.

In one implementation, inquiry step 212 begins by comparing the SNR measurements from the level 1 search to a first noise threshold $T_1$. The noise threshold $T_1$ is determined so that the false alarm probability is below a predetermined level. The SVs which exceed the noise threshold $T_1$ form a set N.

The SNR measurements from the level 1 search are also compared to a second, stronger threshold $T_2$. The SVs which exceed the threshold $T_2$ form the set S. The set S' is defined as the SVs in the set $N_{TOT}$ but excluding S.

In one example, the higher level search is avoided if |S|, the number of SVs in the set S, equals $|N_{TOT}|$, the number of SVs in the set $N_{TOT}$, indicating that all SVs searched for satisfy the stronger threshold $T_2$.

In a second example, a polygon is constructed from the measurements for the SVs in the set N. For each of these SVs, a vector is formed from the satellite azimuth angle and peak carrier signal to noise ratio ($C/N_0$). The vectors are oriented in a coordinate system. The endpoints of the vectors are connected to define a polygon. In this implementation, the second search is avoided if the area A of the polygon equals or exceeds a threshold $A_T$.

Figure 3:
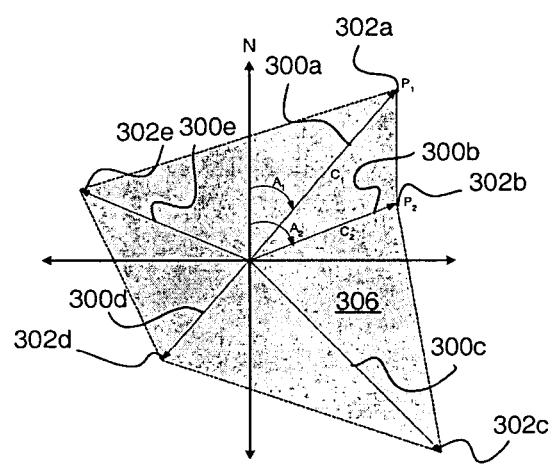
FIG. 3 illustrates an example of a polygon formed from measurements resulting from a level 1 search.

FIG. 3 illustrates an example of a polygon defined by the five vectors 300a, 300b, 300c, 300d, and 300e. Each of these vectors represents or corresponds to a measurement. More specifically, the angle between the vector and the vertical axis is the azimuth angle for the SV, and the magnitude of the vector is the peak carrier signal to noise ratio ($C/N_0$). The endpoints of the vectors are identified with numerals 302a, 302b, 302c, 302d, and 302e. The polygon which is defined by these endpoints is identified with numeral 306. The area of this polygon, which is determined using known techniques, is used in the above comparison.

In a third example, the higher level search is avoided if |N|, the number of SVs in the set N, equals or exceeds a threshold $N_{EE}$.

In a fourth example, the peak carrier signal to noise ratio ($C/N_0$) for each of the SVs in the set N is summed. The higher level search is avoided if this sum equals or exceeds a predetermined threshold.

In a fifth example, a combination of any two or more of the foregoing is employed to determine if the higher level search is to be avoided.

Figure 4:
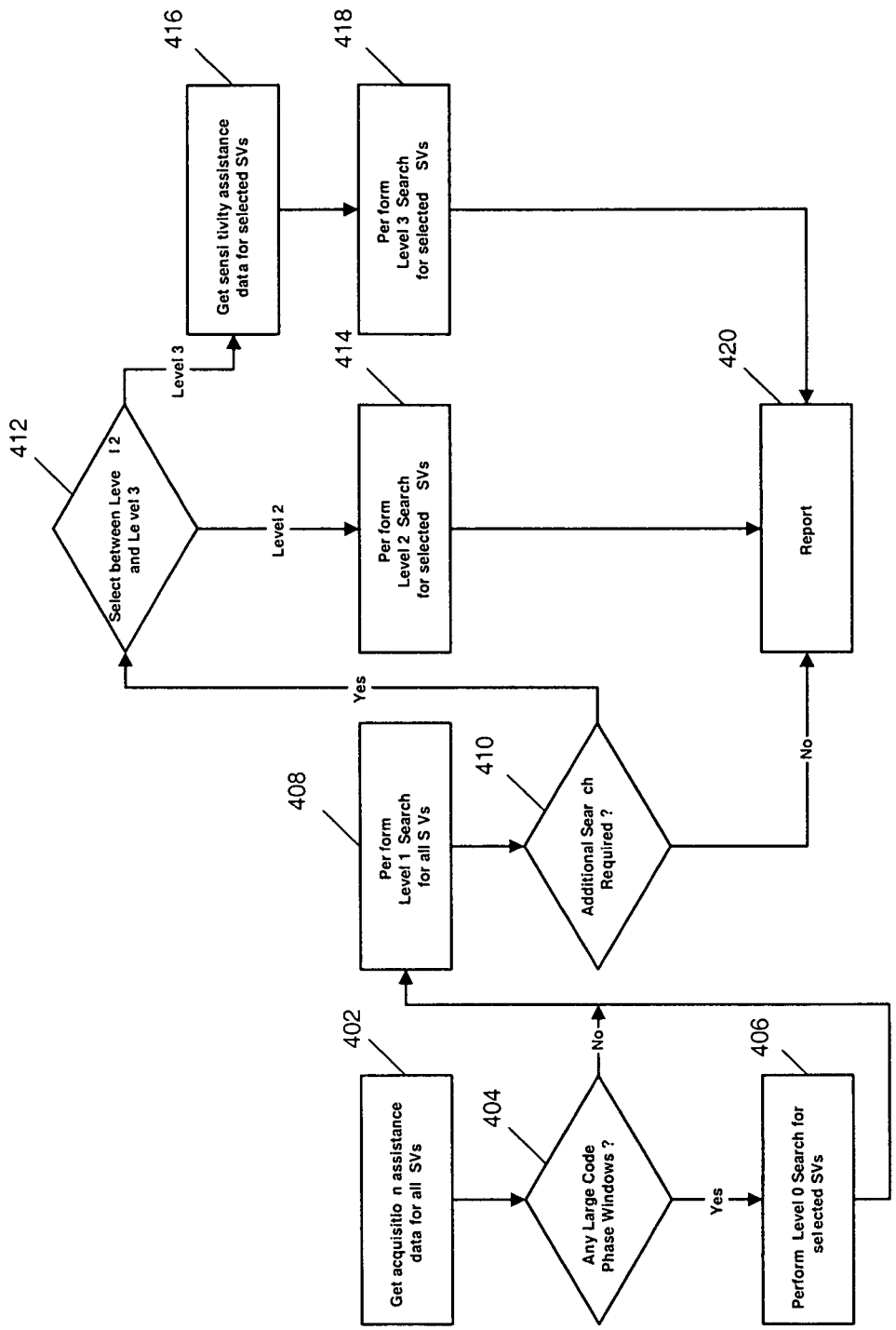
FIG. 4 is a flowchart of an implementation example of a method according to the invention of searching for position determination signals using a plurality of progressively more sensitive searches comprising, in order of increasing sensitivity, level 0, level 1, level 2, and level 3 search modes.

FIG. 4 illustrates an implementation example of a method of searching for position determination signals using a plurality of progressively more sensitive search modes. In this implementation example, the entity whose position is sought to be determined is a subscriber station in an IS-801 compliant wireless communication system.

The search modes which are employed in this example comprise, in order of increasing sensitivity, a level 0 mode, a level 1 mode, a level 2 mode, and a level 3 mode. In one example, the parameters governing each of these modes is illustrated in FIG. 11. As can be seen, in this example, the total integration time utilized in mode 0 is 20 ms, consisting of one 20 ms coherent integration; the total integration time utilized in mode 1 is 80 ms, consisting of four 20 ms coherent integrations non-coherently combined; the total integration time utilized in mode 2 is 880 ms, consisting of 44 20 ms coherent integrations non-coherently combined; and the total integration time utilized in mode 3 is 1760 ms, consisting of 22 80 ms coherent integrations non-coherently combined. Since sensitivity is proportional to total integration time, the sensitivity of the modes also successively increases. In the example illustrated, the sensitivity of mode 0 is 31.0 dB-Hz; the sensitivity of mode 1 is 26.4 dB-Hz; the sensitivity of mode 2 is 19.2 dB-Hz; and the sensitivity of mode 3 is 15.45 dB-Hz.

The method begins with step 402. In this step, the subscriber station obtains acquisition assistance from a PDE for each of the SVs in the set $N_{TOT}$. This acquisition assistance indicates for each such SV a code phase window size, a code phase window center, a Doppler frequency window size, and a Doppler frequency window center. Note that sensitivity assistance, although available, is not requested at this time because of the large overhead involved, and since sensitivity assistance is not required for coherent integration times of 20 ms or less (as utilized in the level 0, 1, and 2 search modes).

The method then proceeds to step 404. In step 404, an inquiry is made whether any of the SVs in the set $N_{TOT}$ have code phase window sizes which exceed a predetermined threshold.

In one configuration, the predetermined threshold is set to identify those SVs whose code phases are such that the SVs cannot be searched through a single pass through the correlator. Consider, for example, a correlator having eight (8) parallel channels with a capacity of 32 chips for each channel, and several chips of overlap between the channels. An SV can be searched with a single pass through the correlator if the code phase search window is less than or equal to about 200 chips, a figure which is derived by subtracting overhead due to overlap between channels from 256 chips, the assumed nominal capacity of the correlator. Therefore, in this configuration, the SVs whose code phase windows exceed 200 chips are searched in the level 1 search. It should be appreciated, however, that this threshold is highly implementation dependent, and will thus vary depending on the implementation.

In step 404, if none of the SVs in the set $N_{TOT}$ have code phase windows which exceed the predetermined threshold, the method jumps to step 408. If any of these SVs have code phase windows which exceed the threshold, step 406 is performed. In step 406, the method comprises performing a level 0 search in relation to each of the SVs in the set $N_{TOT}$ whose code phase search window exceeds the threshold.

For each SV searched in the level 0 search, the maximum peak in the resulting correlation function is located. The code phase window center for the SV is then set to the code phase associated with the maximum peak for the SV. The code phase window size for the SV is also reduced such that the SV can be detected again using a single segment search. The assistance data from any SV that is not detected in the level 0 search is deleted such that these SVs are not searched at subsequent search levels.

From step 406, the method proceeds to step 408. In step 408, the method performs a level 1 search in relation to all the SVs in the set $N_{TOT}$. In this step, selected measurement sufficiency criteria are also applied to measurements derived from the search results, and a flag set if the selected measurement sufficiency criteria are met. These measurement sufficiency criteria will be explained later in relation to FIG. 9.

As part of step 408, the measurements resulting from the level 1 search are classified into three categories: strong, weak, and none. In one example, this classification is performed using thresh-holding. A first threshold $T_1$ is used to identify peaks which are in the weak category, and a second, more stringent threshold $T_2$ is used to identify peaks which are in the strong category. The SVs in the weak category form a set N, and the SVs in the strong category form a set S. The set S' is the SVs in the set $N_{TOT}$ except for those SVs in the set S. Note that similar thresh-holding is also performed in the level 2 and 3 searches, and that the set S may be augmented if a strong peak is identified in either of these searches which was not previously identified in the level 1 search.

In one configuration, illustrated in the table of FIG. 11, the threshold $T_1$ applied in mode 1 to identify weak peaks is 25.0 dB-Hz. In this configuration, the threshold $T_2$ varies with one of three time-to-fix vs. accuracy/sensitivity options selected by the user. More specifically, the threshold $T_2$ for the first, second, and third options is respectively set to 29.4 dB-Hz, 32.4 dB-Hz, and $\infty$. The latter refers to a setting which is so large that the threshold $T_2$ will never be satisfied.

Step 410 follows step 408. In step 410, the flag indicating the status of the application of the selected measurement sufficiency criteria in step 408 is checked. If set, indicating satisfaction of the selected measurement sufficiency criteria, the method proceeds to step 420. In step 420, the measurements resulting from the level 1 search are reported to the PDE, which determines the position of the subscriber station based thereon. Alternatively, the subscriber station determines its own position from these measurements. If not set, indicating lack of satisfaction of the selected measurement sufficiency criteria, the method jumps to step 412.

In step 412, the method applies predetermined selection criteria to determine whether a level 2 or a level 3 search should be performed. These selection criteria will be explained later in relation to FIG. 10. If level 2 is selected, the method proceeds with step 414. If level 3 is selected, the method jumps to step 416.

In step 414, a level 2 search is performed for those SVs in the set S'. The SVs in the set S are not searched since acceptable measurements are considered to have been obtained for these SVs in the level 1 search. From step 414, the method proceeds to step 420. In step 420, the measurements from the level 2 search, and any level 1 measurements for SVs in the set S, are reported to the PDE. In response, the PDE determines the position of the subscriber station from these measurements. Alternatively, the subscriber station determines its own position from these measurements.

In step 416, the subscriber station requests sensitivity assistance from the PDE in order to account for bit phase changes that occur within the 80 ms coherent integration time employed in the level 3 search. As discussed, this step is deferred until now to avoid incurring the overhead of sensitivity assistance in the case when a level 3 search is not required or selected.

From step 416, the method proceeds to step 418. In step 418, the method performs a level 3 search for those SVs in the set S'. Again, the SVs in the set S are not searched since acceptable measurements were obtained for these SVs in the level 1 search.

Step 420 follows step 418. In step 420, the measurements from the level 3 search, and any level 1 measurements for SVs in the set S, are reported to the PDE. In response, the PDE determines the position of the subscriber station. Alternatively, the subscriber station determines its own position from these measurements.

Figure 5:
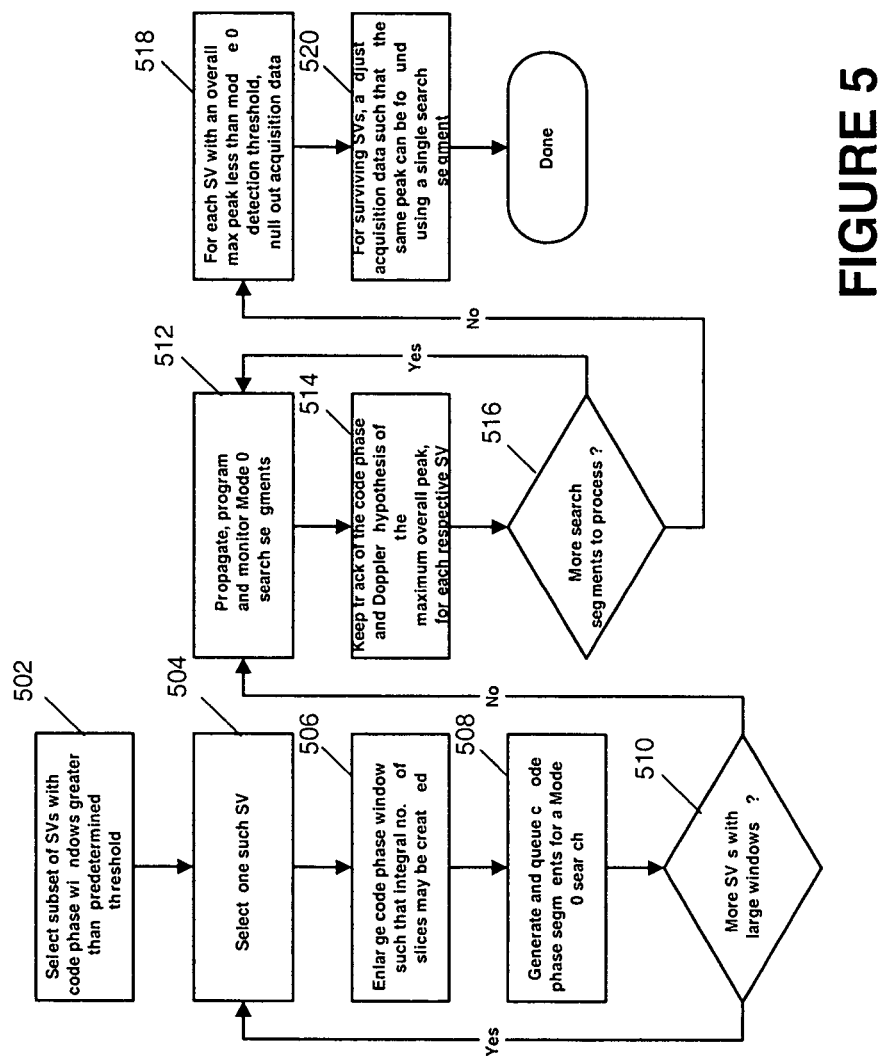
FIG. 5 is a flowchart of the level 0 search in the implementation example of FIG. 4.

FIG. 5 illustrates the tasks or substeps which underlie the level 0 search, block 406, in FIG. 4. In task 502, those SVs in the set $N_{TOT}$ whose code phase window size exceeds a predetermined threshold are identified. In one example, discussed earlier, the predetermined threshold is 200 chips, but it should be appreciated that this threshold is highly implementation dependent, and that other values are possible depending on the implementation.

In task 504, one of these SVs is selected, and in task 506, the code phase window for the selected SV is enlarged if necessary so that the code phase search space for the SV comprises an integral number of slices. For purposes of this disclosure, a slice is the code phase space which can be searched through a single pass through the correlator. In one example, where the correlator comprises 8 parallel channels, each having a capacity of 32 chips, the size of a slice is 256 chips. In this example, the code phase is increased to account for a 4 chip overlap between adjacent segments, and is then further enlarged and re-centered until a total of K*8 segments are implied, where K is an integer. Again, however, it should be appreciated this example is implementation dependent, and that other examples are possible.

Figure 12A:
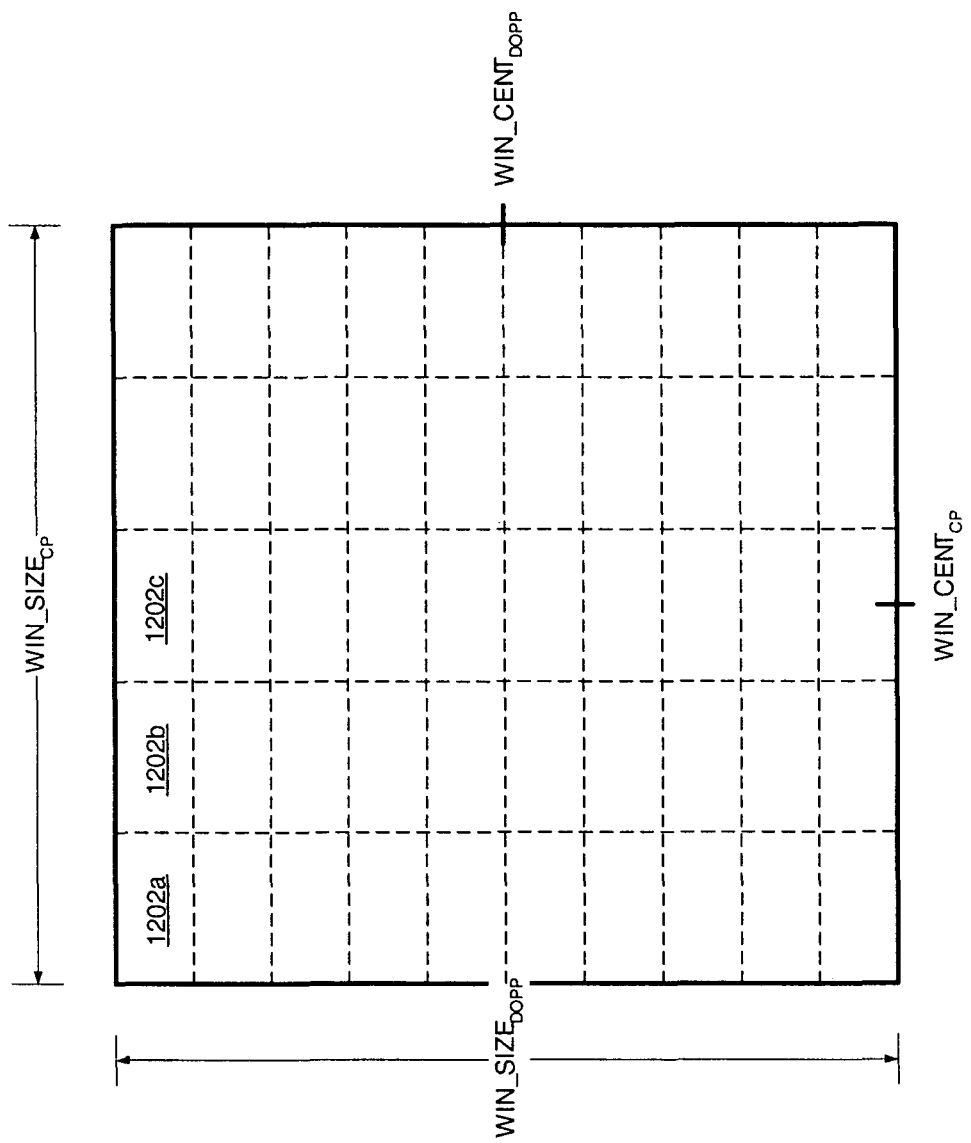
FIGS. 12A-12B illustrate a segmentation procedure employed in the implementation example of FIG. 4, whereby the two-dimensional domain to be searched for a GPS satellite is divided into a plurality of segments, each characterized by a range of Doppler frequencies and a range of code phases.
Figure 12B:
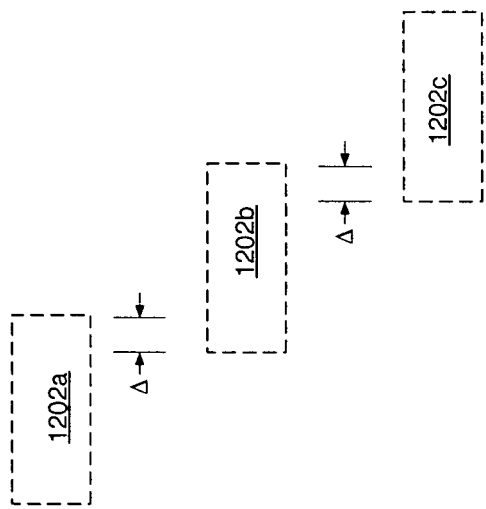

Task 508 follows task 506. In task 508, the search space for the SV is divided up into segments to accommodate a level 0 search. FIGS. 12A and 12B illustrate this segmentation procedure in more detail.

FIG. 12A illustrates the two-dimensional search space for an SV. In this example, the code phase axis is the horizontal axis, and the Doppler frequency axis is the vertical axis, but this assignment is arbitrary and could be reversed. The center of the code phase search window is referred to as $WIN\_CENT_{CP}$, and the size of the code phase search window is referred to as $WIN\_SIZE_{CP}$. The center of the Doppler frequency search window is referred to as $WIN\_CENT_{DOPP}$, and the size of the Doppler frequency search window is referred to as $WIN\_SIZE_{DOPP}$.

The search space is divided up into a plurality of segments 1202a, 1202b, 1202c, each of which is characterized by a range of Doppler frequencies and a range of code phases. In one example, illustrated in the table of FIG. 11, the range of frequencies associated with a segment is ±250 Hz for the level 0, 1, and 2 search modes, and is ±62.5 Hz for the level 3 search mode, and the range of code phases associated with a segment is 32 chips. In this particular example, the range of frequencies characterizing a segment is divided up into 20 bins, and the range of code phases characterizing a segment is divided into 64 bins.

The range of code phases characterizing a segment is advantageously equal to the capacity of a channel of the correlator. That way, the segment can be searched through a single channel pass. In one example where the channel capacity is 32 chips, the range of code phases characterizing a segment is likewise 32 chips, but it should be appreciated that other examples are possible.

The segments advantageously overlap by a prescribed number of chips in order to avoid missing peaks that appear at segment boundaries. FIG. 12B illustrates the overlapping which is typically employed. As illustrated, the tail end of segment 1202a overlaps the front end of segment 1202b by Δ chips, and the tail end of segment 1202b likewise overlaps the front end of segment 1202c by Δ chips. Because of the overhead due to this overlap, the effective range of code phases represented by a segment is typically less than the channel capacity. In the case where the overlap is 4 chips, for example, the effective range of code phrases represented by a segment is 28 chips.

Turning back to FIG. 5, in task 508, the search phase space for the SV is divided up into segments in preparation for a level 0 search, and the segments are queued. Then, task 510 is performed. In task 510, it is determined whether any additional SVs are present in the set $N_{TOT}$ whose search widows exceed the predetermined threshold. If so, the method loops back to step 504 for another pass through tasks 504, 506, and 508. If not, the method proceeds with step 512. Through performance of tasks 504, 506, 508, and 510, it can be seen that the search space for each SV whose code phase search window exceeds the predetermined threshold is divided up into segments which are queued in preparation for a level 0 search.

In task 512, the level 0 search is performed by adjusting the segment code phase and Doppler window parameters to account for the time elapsed between the time of the assistance data and the time the level 0 search is performed, and then processing the segments through the correlator. Again, in one example, where the correlator comprises eight parallel channels, the segments are processed through the correlator eight segments at a time, but it should be appreciated that other examples are possible. The integrations are performed by the correlator in accordance with the level 0 integration parameters. Advantageously, these parameters emphasize speed rather than sensitivity. In one example, the integration parameters for the level 0 search comprise, as set forth in the table of FIG. 11, a single coherent integration of 20 ms. Accordingly, the level 0 search will typically only detect the strongest signals.

Task 514 follows 512. In task 514, the code phase and Doppler frequency bin associated with the strongest peak associated with each SV which is searched is retained. Task 516 loops back to task 512 until all the queued segments have been searched. Advantageously, all the segments are searched within a fraction of a single GPS frequency tune time, but it should be appreciated that it is possible that multiple GPS frequency tune times may be required to search through all the segments.

After all the segments have been searched, task 518 is performed. In task 518, the strongest peak for each SV that was searched is compared to a mode 0 detection threshold. In one example, illustrated in the table of FIG. 11, the mode 0 detection threshold is 29.8 dB-Hz. If the strongest peak for an SV falls below the threshold, the acquisition data for the SV, i.e., the search window sizes and centers, is nulled out, thus ensuring that the SV will not be further searched or reported. That is desirable since these SVs represent those SVs with large search windows which could not be reduced through the level 0 search. Thus, it is important to eliminate these SVs from the class of SVs which are searched to avoid time out conditions and the like.

Task 520 follows task 518. In task 520, for each of the surviving SVs, i.e., those SVs whose strongest peak exceeds the level 0 threshold, the center of the code phase window for the SV is located at the peak, and the window size is reduced so that the peak can be found through a single pass of a segment through the correlator. Moreover, the $0^{th}$ order Doppler is modified to be that of the center frequency of the Doppler bin where the max peak is located.

Once task 520 has been completed, the level 0 search is completed.

Figure 6:
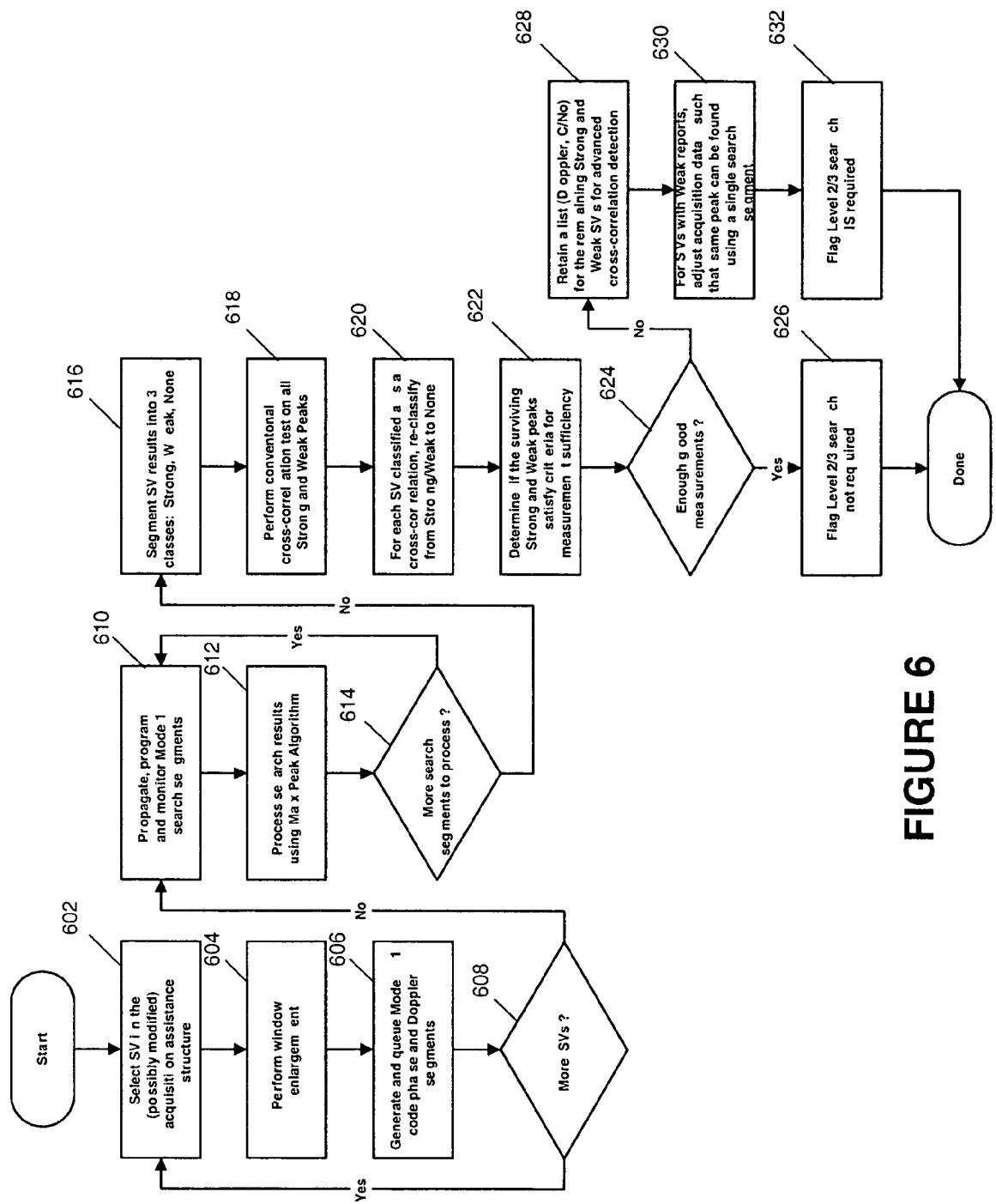
FIG. 6 is a flowchart of the level 1 search in the implementation example of FIG. 4.

FIG. 6 illustrates the tasks which underlie the level 1 search, block 408, of FIG. 4. In task 602, an SV in the set $N_{TOT}$, whose acquisition assistance data is still intact, and which may have been modified through the level 0 search, is selected.

Task 604 is then performed. In task 604, the code phase search window for the SV is enlarged to account for code drift over time. In one example, an enlargement of 4 chips is implemented.

Task 606 follows task 604. In task 606, the search space for the SV is divided up into segments in preparation for a level 1 search, and the segments queued. In one example, as illustrated in FIG. 11, a segment for a level 1 search is characterized by a ±250 Hz range of Doppler frequencies, divided up into 20 bins, and a range of 32 chips, divided up into 64 bins.

In task 608, an inquiry is made whether there are additional SVs with intact acquisition data which need to be searched in level 1. If so, the method loops back to task 602. If not, the method proceeds with task 610. Through tasks 602 and 608, tasks 604 and 606 are performed for each of the SVs in the set $N_{TOT}$ whose acquisition data is intact after performance of the level 0 search.

In task 610, all the queued level 1 segments are processed through the correlator. In one example, the segments are processed through the correlator eight at a time, but it should be appreciated that other examples are possible.

Task 612 is then performed. In task 612, a Max Peak algorithm is performed. In accordance with this algorithm, the strongest peak for each SV searched in the level 1 search is retained.

Task 614 follows task 612. In task 614, an inquiry is made whether there are additional level 1 segments to process. If so, the method loops back to task 610. If not, the method proceeds with task 616. Task 614 causes the method to iterate through tasks 610 and 612 until all level 1 segments have been processed.

The integration time underlying the level 1 search emphasizes speed rather than sensitivity, but does so to a lesser extent than the level 0 search. In one example, the level 1 integration time is, as illustrated in FIG. 11, 80 ms, comprising four 20 ms coherent integrations which are non-coherently combined. Advantageously, due to the level 1 integration parameters, and the reduction in search windows achieved through the level 0 search, all level 1 segments are processed in a single GPS frequency tune period.

Task 616 is then performed. In task 616, the SVs searched in the level 1 search are divided into three categories, strong, weak, and none. In one example, the classification is performed through thresh-holding. If the strongest peak found for the SV exceeds a threshold $T_1$, the SV is placed in the weak category. If the strongest peak found for the SV exceeds a second stronger threshold $T_2$, the SV is placed in the strong category. In one example, as illustrated in FIG. 11, the threshold $T_1$ is 25.0 dB-Hz. The threshold $T_2$, as indicated previously, varies with a time-to-fix vs. accuracy/sensitivity option selected by the user. In one configuration, one of three options are possible; the threshold $T_2$ for the first, second, and third options is respectively set to 29.4 dB-Hz, 32.4 dB-Hz, and $\infty$. The latter refers to a setting which is so large that the threshold $T_2$ will never be satisfied.

The SVs in the weak category define a set N, and the SVs in the strong category define a set S. The set S' comprises those SVs in the set $N_{TOT}$ excluding those SVs in the set S.

Task 618 follows task 616. In task 618, the peaks in the strong and weak categories are analyzed to ensure they are not due to cross-correlation. The analysis performed to detect peaks due to cross-correlation is conventional, and need not be detailed here.

Task 620 is then performed. In task 620, if a peak in the strong or weak category is determined to be due to cross-correlation, the peak is reclassified to the None category, i.e., treated as though it did not satisfy the $T_1$ threshold.

Task 622 is then performed. In task 622, it is determined whether the measurements derived from the level 1 search results satisfy one or more selected measurement sufficiency criteria. Task 624 is then performed. In task 624, if the level 1 measurements satisfy the one or more selected measurement sufficiency criteria, task 626 is performed. In task 626, a flag is set indicating that a level 2 or 3 search is not required. In task 624, if the level 1 measurements fail to satisfy the one or more selected measurement sufficiency criteria, task 628 is performed.

Figure 9:
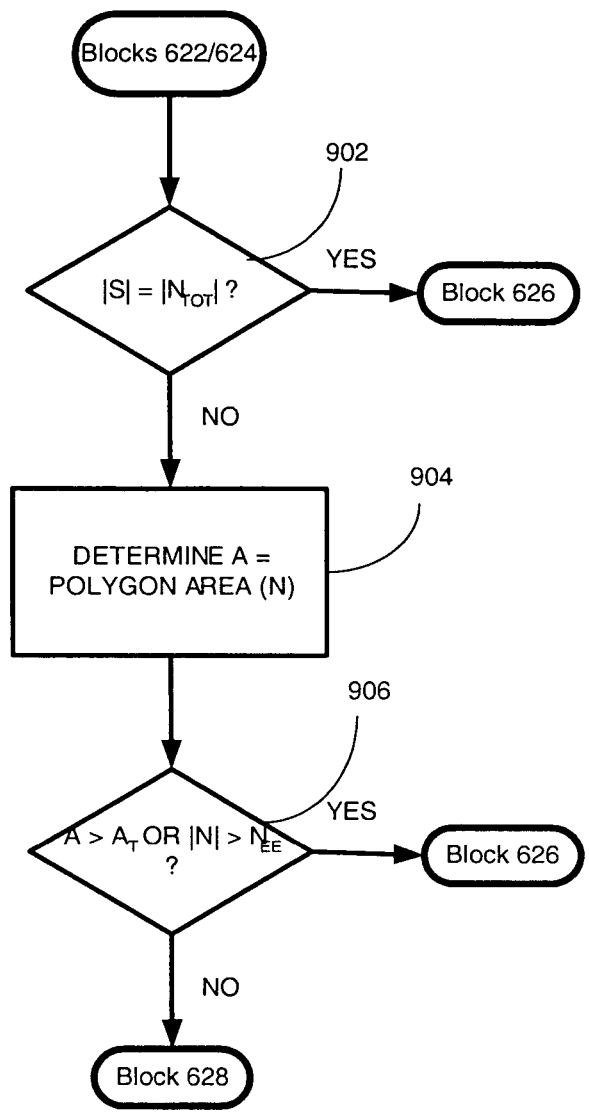
FIG. 9 is a flowchart of the measurement sufficiency criteria employed in the level 1 search of FIG. 6.

The specific substeps underlying tasks 622 and 624 are illustrated in FIG. 9. In substep 906, |S|, the number of SVs in the set S and therefore the strong category, is compared to $|N_{TOT}|$, the number of SVs in the set $N_{TOT}$. If |S| equals $|N_{TOT}|$, indicating that all SVs in the set $N_{TOT}$ are in the strong category, the method proceeds to task 626, whereby the flag is set indicating that a level 2 or 3 search is not required.

If |S| does not equal $|N_{TOT}|$, substep 904 is performed. In substep 904, the polygon described earlier in relation to FIG. 3 is formed from the measurements for the SVs in the set N, and the area A of this polygon is determined.

Inquiry substep 906 follows substep 904. In inquiry substep 906, the area A of the polygon is compared to a threshold area $A_T$. In addition, |N|, the number of SVs in the set N, is compared to a threshold $N_{EE}$. If the area A exceeds $A_T$ or |N| exceeds $N_{EE}$, the method jumps to task 626 in FIG. 6. Otherwise, the method proceeds with task 628 in FIG. 6.

In one example, the threshold area $A_T$ and the threshold number $N_{EE}$ vary with the time-to-fix vs. accuracy/sensitivity threshold selected by the user. In one configuration, the threshold area $A_T$ for the first, second, and third options is respectively set to $4 \times 10^7$, $6 \times 10^7$, and $\infty$. The latter refers to a setting which so large that the threshold is never satisfied. In addition, the threshold number $N_{EE}$ for the first, second and third options is respectively set to 4, 5, and $\infty$. Again, the latter refers to a setting which is so large that the threshold is never satisfied.

Turing back to FIG. 6, task 628 is performed if the level 1 measurements fail to satisfy the one or more selected measurement sufficiency criteria. In task 628, a list of the strong and weak peaks, and the measurements derived there-from, such as the Doppler and code phase bin containing the peak, and the peak carrier signal to noise ratio ($C/N_0$) for the peak, is retained. This list is used in the subsequent level 2 or 3 search to detect peaks due to cross-correlation.

Task 630 is then performed. In task 630, the acquisition data for the SVs corresponding to the weak peaks, i.e., those in the set N, is adjusted so that the peak can be located through a single search segment. Accordingly, the code phase window is re-centered on the code phase where the peak is found, and the size of the code phase window is reduced to 28 chips. Similarly, the Doppler window size is reduced to 25 Hz, and the $0^{th}$ order Doppler is modified to be that of the interpolated frequency where the peak is found.

Task 632 is then performed. In task 632, a flag is set indicating that a level 2 or 3 is required. The level 1 search then concludes.

Figure 10:
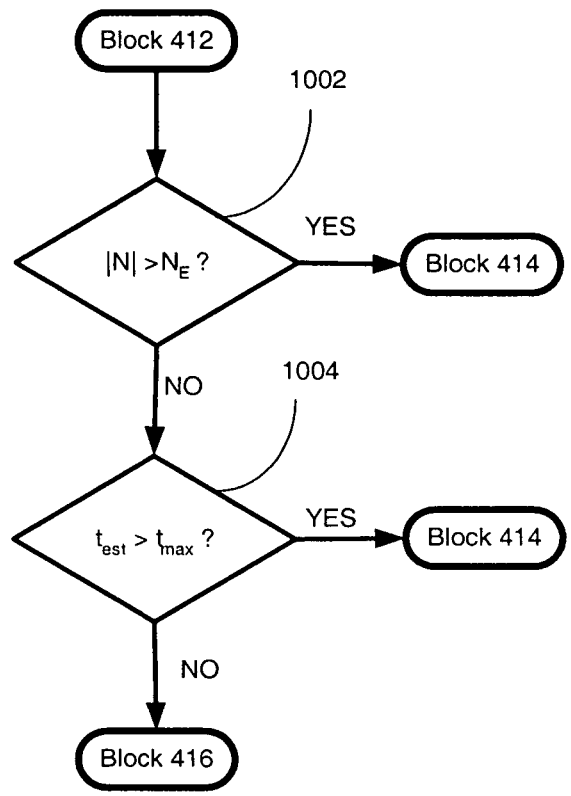
FIG. 10 is a flowchart of the level 2/level 3 selection criteria employed in the implementation example of FIG. 4.

FIG. 10 illustrates the substeps underlying task 412, in which a level 2 or 3 search is selected. In inquiry substep 1002, |N|, the number of SVs in the set N, is compared with a second threshold number $N_E$. If |N| exceeds $N_E$, a jump is made to block 414, and a level 2 search is performed. Otherwise, the method proceeds with inquiry substep 1004.

In one example, the second threshold number $N_E$ varies with the time-to-fix vs. accuracy/sensitivity option selected by the user. In one configuration, the value of $N_E$ for the first, second and third options is respectively set to 5, 5, and $\infty$. The latter indicates a setting which is so large that the threshold is never satisfied.

In inquiry substep 1004, an estimate $t_{est}$ is made of the time required to performed a level 3 search on the SVs in the set S'. This time is compared with the maximum time $t_{max}$ which is remaining in the current GPS position location session. If $t_{est}$ exceeds $t_{max}$, indicating there is insufficient time to conduct a level 3 search in the current session, the method proceeds to task 414 of FIG. 4. Otherwise, the method proceeds with task 416.

In one example, the time $t_{max}$ is based on quality of service considerations. In a second example, involving a PDE-initiated or mobile-terminated search, such as that stemming from a 911 call by a subscriber station in an IS-801 compliant system, $t_{max}$ is the Preferred Response Quality (PRQ) value specified by the PDE. In a third example, for a mobile-initiated search, such as that involving an Internet geography-based search initiated by the subscriber station, $t_{max}$ is assigned by the subscriber station.

Figure 7:
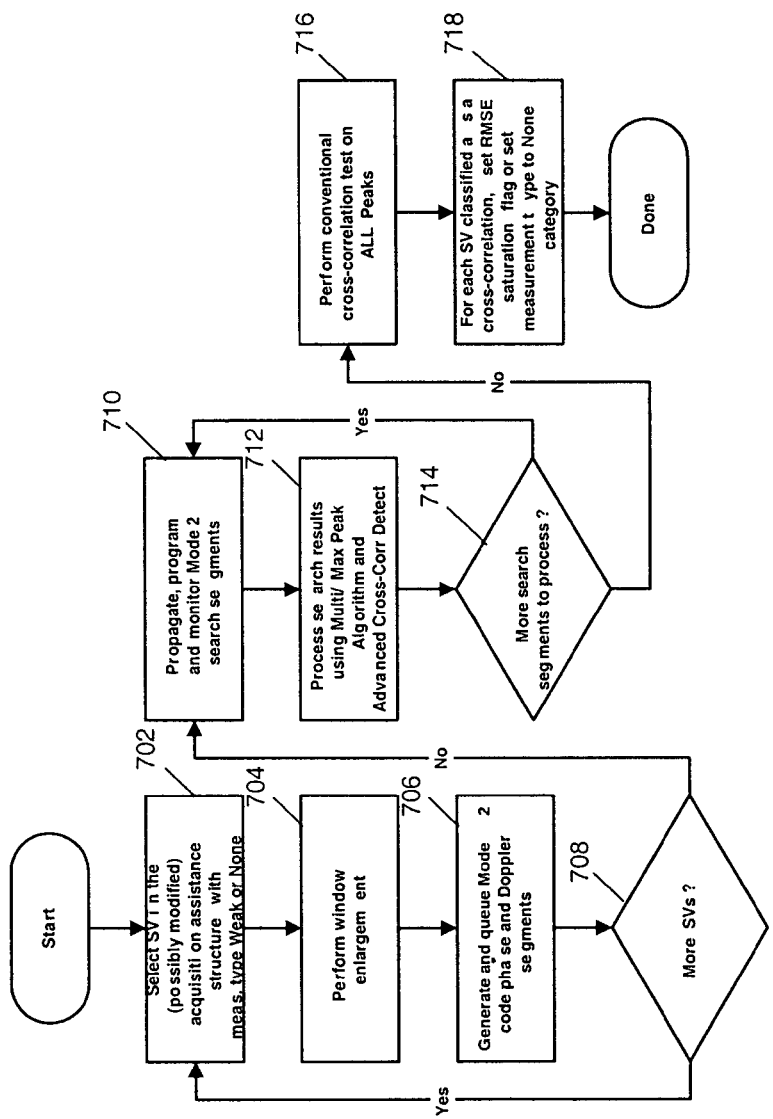
FIG. 7 is a flowchart of the level 2 search in the implementation example of FIG. 4.

FIG. 7 illustrates the tasks underlying the level 2 search, block 414, of FIG. 4. In task 702, an SV in the set S', i.e., those SVs previously classified as being within the weak or None categories, is selected.

Task 704 follows task 702. In task 704, the code phase window for the selected SV is increased to accommodate overlapping of segments between adjacent correlator segments. In one example, the segments are overlapped by four chips, but it should be appreciated that other examples are possible.

Task 706 follows task 704. In task 706, the search space for the selected SV is divided up into segments in preparation for a level 2 search, and the segments are queued. In one example, level 2 segments, as illustrated in FIG. 11, are characterized by a range of ±250 Doppler frequencies, divided up into 20 bins, and a range of 32 code phases, divided up into 64 bins.

Task 708 follows task 706. In task 708, an inquiry is made whether there are additional SVs in the set S'. If so, the method loops back to task 702 for another iteration. If not, the method proceeds with task 710. Through iterations through the loop represented by the tasks 702, 704, 706, and 708, the method generates and queues level 2 segments for each of the SVs in the set S'.

In task 710, level 2 segments are processed through the correlator. In one example, where the correlator comprises eight parallel channels, eight segments are processed through the correlator at a time, although it should be appreciated that other examples are possible.

Task 712 follows task 710. In task 712, a Multi/Max Peak algorithm is applied to locate, for each SV in the set S', the earliest valid peak for the SV. This is in contrast to the Max Peak algorithm referred to in task 612, which locates the strongest peak for each SV involved in the respective search. According to one example of the Multi/Max Peak algorithm, a valid peak for the SV is the strongest peak for that SV unless there is an earlier peak within 4 chips and 15 dB of the strongest peak, in which case the valid peak is the earlier peak. This algorithm recognizes that the earliest peak is not always the strongest peak but can be a weaker peak earlier in time than the strongest peak.

In addition, the peaks which are identified in task 712 are analyzed to determine if they represent cross-correlations of the peaks listed in task 628. If a peak is so identified, the peak is discarded at run time in preference to other weaker peaks that may better represent the SV. In one example, this step occurs by comparing the $C/N_0$ and Doppler values of the peaks identified in task 712 with the corresponding values of the peaks identified in step 628.

Task 714 follows task 712. In task 714, an inquiry is made whether there are any remaining level 2 segments to process. If so, the method loops back to task 710 for another iteration. If not, the method proceeds to step 716. Through one or more iterations through tasks 710, 712, and 714, all level 2 segments are processed.

The integration parameters underlying the level 2 search emphasize sensitivity and accuracy rather than speed. In one example, illustrated in FIG. 11, the integration underlying the level 2 search comprises 44 20 ms coherent integrations which are non-coherently combined. In one example, the level 2 integration parameters are such that two level 2 segments can be processed by each correlator channel in one GPS frequency tune period. In the case where the correlator has eight parallel channels, that translates into a requirement that at least 16 segments be processed in a single GPS frequency tune period.

Advantageously, all the level 2 segments can be processed in a single GPS frequency tune period, but it should be appreciated that it is possible that multiple GPS frequency tune periods will be required to process the level 2 segments.

Task 716 is then performed. In task 716, a conventional cross-correlation test is applied to all the peaks which have been identified. These include the peaks in the set S, identified through either the level 1 or level 2 searches, and the peaks in the set S'. Since this test is conventional, it need not be detailed here.

Task 718 follows task 716. In task 718, for each peak identified as a cross-correlation, the RMSE saturation flag for the peak is set, or alternatively, the measurement type is set to the None category, indicating that the peak should be ignored for purposes of position determination. The level 2 search then concludes.

Figure 8:
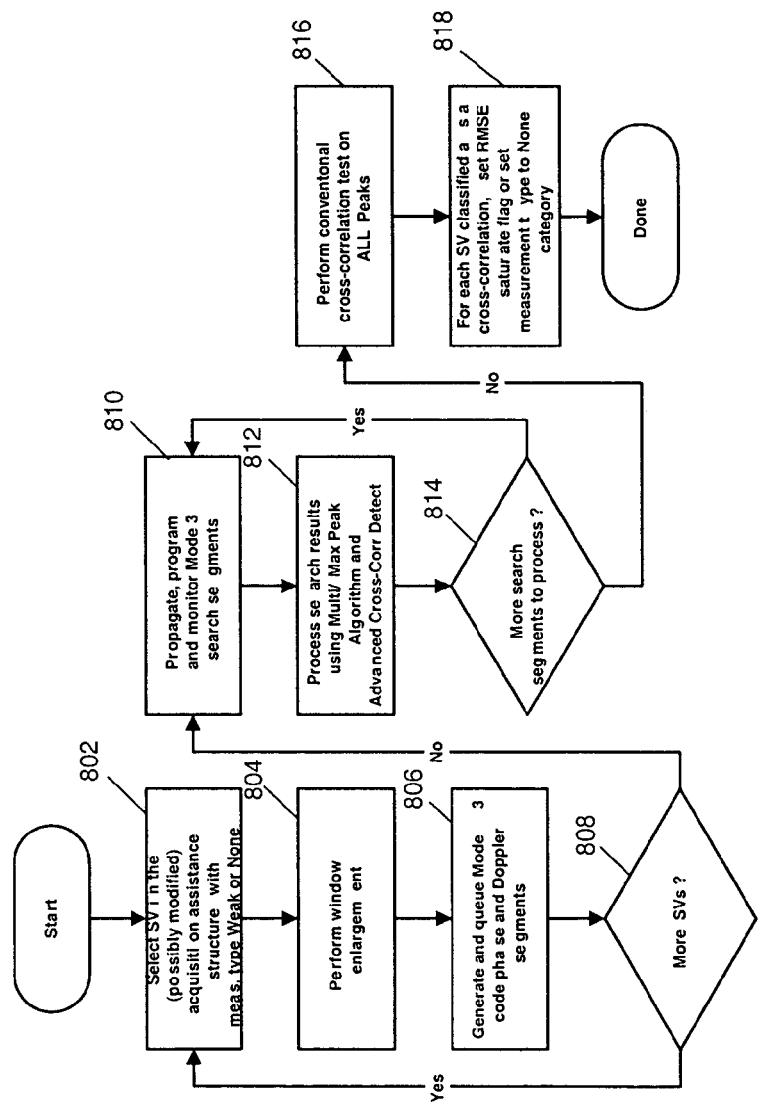
FIG. 8 is a flowchart of the level 3 search in the implementation example of FIG. 4.

FIG. 8 illustrates the tasks underlying the level 3 search, block 418, of FIG. 4. In task 802, an SV in the set S', i.e., those SVs previously classified as being within the weak or none categories, is selected.

Task 804 follows task 802. In task 804, the code phase window for the selected SV is increased to account for code drift over time. In one example, the segments are enlarged by four chips.

Task 806 follows task 804. In task 806, the search space for the selected SV is divided up into segments in preparation for a level 3 search, and the segments are queued. In one example, a level 3 segments is, as illustrated in FIG. 11, characterized by a range of ±62.5 Doppler frequencies, divided up into 20 bins, and a range of 32 code phases, divided up into 64 bins.

Task 808 follows task 806. In task 808, an inquiry is made whether there are additional SVs in the set S'. If so, the method loops back to task 802 for another iteration. If not, the method proceeds with task 810. Through iterations through the loop represented by the tasks 802, 804, 806, and 808, the method generates and queues level 3 segments for each of the SVs in the set S'.

In task 810, level 3 segments are processed through the correlator. In one example, where the correlator comprises eight parallel channels, eight segments are processed through the correlator at a time, although it should be appreciated that other examples are possible.

Task 812 follows task 810. In task 812, the Multi/Max Peak algorithm is applied to locate, for each SV in the set S', the earliest valid peak for the SV. In addition, the peaks which are identified in task 812 are analyzed to determine if they represent cross-correlations of the peaks listed in task 628. If a peak is so identified, the peak is discarded at run time in preference to other weaker peaks that may better represent the SV. In one example, this step occurs by comparing the $C/N_0$ and Doppler values of the peaks identified in task 812 with the corresponding values of the peaks identified in step 628.

Task 814 follows task 812. In task 814, an inquiry is made whether there are any remaining level 3 segments to process. If so, the method loops back to task 810 for another iteration. If not, the method proceeds to step 816. Through one or more iterations through tasks 810, 812, and 814, all level 3 segments are processed.

The integration parameters underlying the level 3 search emphasize sensitivity and accuracy rather than speed, and do so to a greater degree than the level 2 search. In one example, illustrated in FIG. 11, the integration underlying the level 3 search comprises 22 80 ms coherent integrations which are non-coherently combined. In one example, the level 3 integration parameters are such that one level 3 segments can be processed by each correlator channel in one GPS frequency tune period. In the case where the correlator has eight parallel channels, that translates into a requirement that at least 8 segments be processed in a single GPS frequency tune period.

Since the coherent integration time employed in the level 3 search is 80 ms, which exceeds the 20 ms time period over which a data bit is modulated onto an SV signal, the coherent integration in the level 3 search is performed with the sensitivity assistance from the PDE provided in task 416 to account for bit phase changes that occur within the 80 ms coherent integration time.

Advantageously, all the level 3 segments are processed in a single GPS frequency tune period, but it should be appreciated that it is possible for multiple GPS frequency tune periods to be required to process the level 3 segments.

Task 816 is then performed. In task 816, a conventional cross-correlation test is applied to all the peaks which have been identified. These include the peaks in the set S, identified through either the level 1 or level 3 searches, and those in the set S'. Since this test is conventional, it need not be detailed here.

Task 818 follows task 816. In task 818, for each peak identified as a cross-correlation, the RMSE saturation flag for the peak is set, or alternatively, the measurement type is set to the None category, indicating that the peak should be ignored for purposes of position determination. The level 3 search then concludes.

Figure 13:
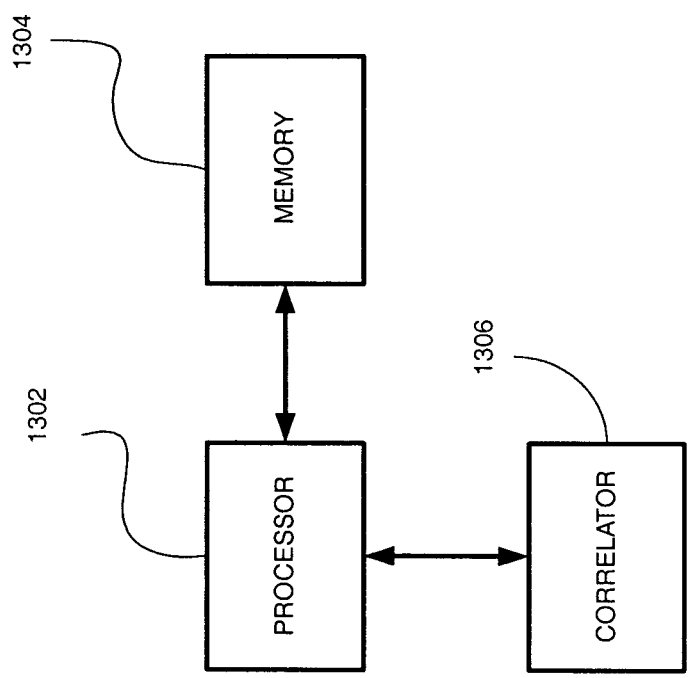
FIG. 13 is a block diagram of an embodiment of a system according to the invention for searching for position determination signals using a plurality of progressively more sensitive search modes.

An embodiment of a system for searching for position determination signals within a prescribed time period is illustrated in FIG. 13. As illustrated, the system comprises processor 1302, memory 1304, and correlator 1306.

The correlator 1306 is configured to produce correlation functions from signals provided to it by a receiver (not shown), and provide them to processor 1302, either directly or through memory 1304. The correlator 1306 may be implemented in hardware, software, or a combination of hardware and software.

The memory 1304 tangibly embodies a series of software instructions for performing any of the methods of FIGS. 2, 4-10, or any of the embodiments, implementations, or examples thereof which have been described or suggested.

The processor is configured to access and execute the software instructions tangibly embodied by memory 1304. Through execution of these instructions, the processor 1302 directs the correlator 1306 to search for position determination signals, either as part of a level 0, level 1, level 2, or level 3 search, and it derives measurements from the resulting correlation functions provided to it by correlator 1306.

If the search is a level 1 search, the processor 1302 determines whether the level 1 measurements satisfy one or more selected measurement sufficiency criteria. If so, the processor 1302 terminates the search. If not, the processor 1302 directs the correlator 1306 to perform a level 2 or 3 search for position determination signals.

Figure 14:
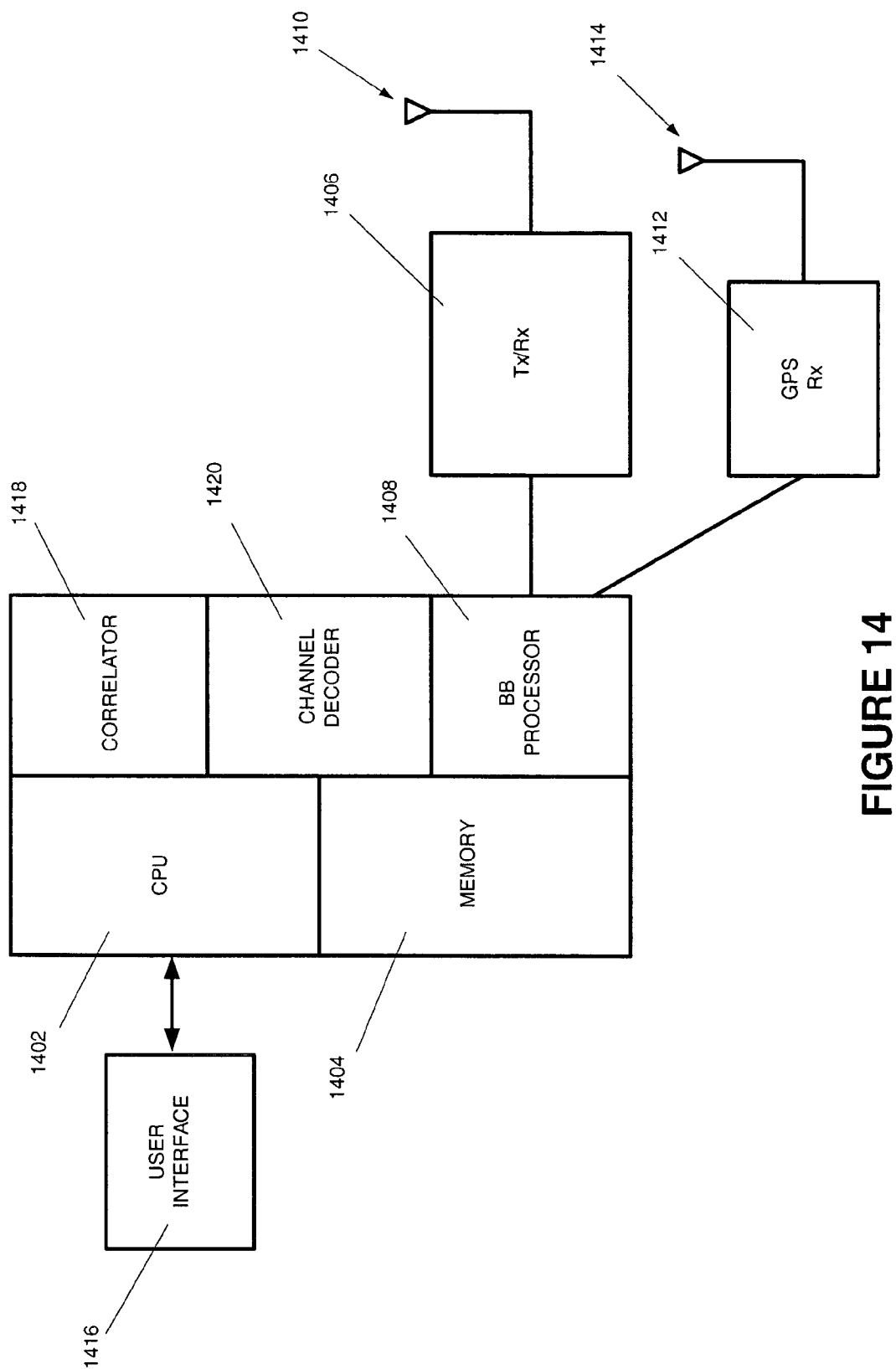
FIG. 14 is a block diagram of an embodiment of a subscriber station embodying or incorporating the system of FIG. 13.

An embodiment of a subscriber station in a wireless communication system is illustrated in FIG. 14. This particular subscriber station is configured to embody or incorporate the system of FIG. 13.

Radio transceiver 1406 is configured to modulate baseband information, such as voice or data, onto an RF carrier, and demodulate a modulated RF carrier to obtain baseband information.

An antenna 1410 is configured to transmit a modulated RF carrier over a wireless communications link and receive a modulated RF carrier over a wireless communications link.

Baseband processor 1408 is configured to provide baseband information from CPU 1402 to transceiver 1406 for transmission over a wireless communications link. The CPU 1402 in turn obtains the baseband information from an input device within user interface 1416. Baseband processor 1408 is also configured to provide baseband information from transceiver 1406 to CPU 1402. CPU 1402 in turn provides the baseband information to an output device within user interface 1416.

User interface 1416 comprises a plurality of devices for inputting or outputting user information such as voice or data. The devices typically included within the user interface include a keyboard, a display screen, a microphone, and a speaker.

GPS receiver 1412 is configured to receive and demodulate GPS satellite transmissions, and provide the demodulated information to correlator 1418.

Correlator 1418 is configured to derive GPS correlation functions from the information provided to it by GPS receiver 1412. For a given PN code, correlator 1418 produces a correlation function which is defined over a range of code phases which define a code phase search window, and over a range of Doppler frequency hypotheses. Each individual correlation is performed in accordance with defined coherent and non-coherent integration parameters.

Correlator 1418 may also be configured to derived pilot-related correlation functions from information relating to pilot signals provided to it by transceiver 1406. This information is used by the subscriber station to acquire wireless communications services.

Channel decoder 1420 is configured to decode channel symbols provided to it by baseband processor 1408 into underlying source bits. In one example, where the channel symbols are convolutionally encoded symbols, the channel decoder is a Viterbi decoder. In a second example, where the channel symbols are serial or parallel concatenations of convolutional codes, the channel decoder 1420 is a turbo decoder.

Memory 1404 is configured to hold software instructions embodying any of the methods of FIGS. 2, 4-10, or any of the embodiments, implementations, or examples thereof which have been described or suggested.

CPU 1402 is configured to access and execute these software instructions. Through execution of these software instructions, the CPU 1402 directs correlator 1418 to perform level 0, level 1, level 2, or level 3 searches as the case may be, analyze the GPS correlation functions provided to it by correlator 1418, derive measurements from the peaks thereof, and, in the case of level 1 measurements, determine whether the level 1 measurements satisfy selected measurement sufficiency criteria, or whether level 2 or 3 searches are required to fix the position of the entity.

CPU 1402 is also configured to determine the root mean square error (RMSE) associated with each of the measurements. These measurements and RMSE values are provided to a PDE (not shown). The PDE weights each of the measurements based on the inverse of its corresponding RMSE value, and then estimates the location of the subscriber station based on the weighted measurements. Alternatively, the subscriber station determines its own location from this information.

While various embodiments, implementations and examples have been described, it will be apparent to those of ordinary skill in the art that many more embodiments, implementations and examples are possible that are within the scope of this invention. In particular, embodiments are possible where the invention is employed to search for position determination signals comprising base station transmissions, or combinations of base station and GPS satellite transmissions. Embodiments are also possible where the invention is extended to search procedures involving any number of levels of search modes, including configuration employing levels beyond level 3. Embodiments are also possible in relation to subscriber stations which employ dual RF solutions in contrast to shared RF solutions. Consequently, the invention is not to be limited except in relation to the appended claims.

What is claimed is:

1. A method of searching for position determination signals using a plurality of progressively more sensitive search modes with sensitivity levels that are characterized by their respective integration periods and which plurality comprises, in order of increasing sensitivity, a first level mode, a second level mode, and a third level mode, the method comprising:

performing, on a wireless subscriber station, a first level search associated with a first integration period as part of a position fix attempt of the wireless subscriber station;

deriving, on the wireless subscriber station, one or more measurements from the ensuing search results;

determining, on the wireless subscriber station, whether the measurements satisfy one or more selected measurement sufficiency criteria;

avoiding additional searching within the position fix attempt if the wireless subscriber station determines that the measurements satisfy the one or more selected measurement sufficiency criteria; and performing, on the wireless subscriber station, a higher level search beyond the first level search if the wireless subscriber station determines that the measurements do not satisfy the one or more selected measurement sufficiency criteria, wherein:

the higher level search is a second level search if a number of space vehicles in a first set exceeds a threshold number or an estimated time to perform a third level search on a number of space vehicles in a second set exceeds a maximum time remaining in the position fix attempt, the higher level search is the third level search if the number of space vehicles in the first set does not exceed the threshold number and the estimated time to perform the third level search on the number of space vehicles in the second set does not exceed the maximum time remaining in the position fix attempt, the second level search is associated with a second integration period that is longer than the first integration period, and the third level search is associated with a third integration period that is longer than the second integration period.

2. The method of claim 1 further comprising discarding those measurements from the higher level search which are determined to be cross-correlations of the measurements from the first level search.

3. The method of claim 2 wherein the measurements from the higher level search are discarded at run time in favor of other measurements which better represent a space vehicle.

4. The method of claim 1, wherein performing the higher level search comprises:

comparing the number of space vehicles in the first set to the threshold number if the wireless subscriber station determines that the measurements do not satisfy the one or more selected measurement sufficiency criteria; and performing the second level search if the number of space vehicles in the first set exceeds the threshold number.

5. The method of claim 4, wherein performing the higher level search further comprises:

comparing the estimated time to perform the third level search on the number of space vehicles in the second set to the maximum time remaining in the position fix attempt if the number of space vehicles in the first set does not exceed the threshold number;

performing the second level search if the estimated time to perform the third level search on the number of space vehicles in the second set exceeds the maximum time remaining in the position fix attempt; and performing the third level search if the estimated time to perform the third level search on the number of space vehicles in the second set does not exceed the maximum time remaining in the position fix attempt.

6. The method of claim 1, wherein the first set comprises space vehicles used in the first level search that exceed a first noise threshold, the second set comprises space vehicles that are likely visible to the wireless subscriber station and excludes space vehicles used in the first level search that exceed a second noise threshold, and the second noise threshold is stronger than the first noise threshold.

7. A method of searching for position determination signals using a plurality of progressively more sensitive search modes with sensitivity levels that are characterized by their respective integration periods and which plurality comprises, in order of increasing sensitivity, a first level mode, a second level mode, and a third level mode, the method comprising:

a step for performing, on a wireless subscriber station, a first level search associated with a first integration period as part of a position fix attempt of the wireless subscriber station;

a step for deriving, on the wireless subscriber station, one or more measurements from the ensuing search results;

a step for determining, on the wireless subscriber station, whether the measurements satisfy one or more selected measurement sufficiency criteria;

a step for avoiding additional searching within the position fix attempt if the wireless subscriber station determines that the measurements satisfy the one or more selected measurement sufficiency criteria; and a step for performing, on the wireless subscriber station, a higher level search beyond the first level search if the wireless subscriber station determines that the measurements do not satisfy the one or more selected measurement sufficiency criteria, wherein:

the higher level search is a second level search if a number of space vehicles in a first set exceeds a threshold number or an estimated time to perform a third level search on a number of space vehicles in a second set exceeds a maximum time remaining in the position fix attempt, the higher level search is the third level if the number of space vehicles in the first set does not exceed the threshold number and the estimated time to perform the third level search on the number of space vehicles in the second set does not exceed the maximum time remaining in the position fix attempt, the second level search is associated with a second integration period that is longer than the first integration period, and the third level search is associated with a third integration period that is longer than the second integration period.

8. The method of claim 7 further comprising a step for discarding those measurements from the higher level search which are determined to be cross-correlations of the measurements from the first level search.

9. The method of claim 8 wherein the measurements from the higher level search are discarded at run time in favor of other measurements which better represent a space vehicle.

10. The method of claim 7, wherein the step for performing the higher level search comprises:

a step for comparing the number of space vehicles in the first set to the threshold number if the wireless subscriber station determines that the measurements do not satisfy the one or more selected measurement sufficiency criteria; and a step for performing the second level search if the number of space vehicles in the first set exceeds the threshold number.

11. The method of claim 10, wherein the step for performing the higher level search comprises:

a step for comparing the estimated time to perform the third level search on the number of space vehicles in the second set to the maximum time remaining in the position fix attempt if the number of space vehicles in the first set does not exceed the threshold number;

a step for performing the second level search if the estimated time to perform the third level search on the number of space vehicles in the second set exceeds the maximum time remaining in the position fix attempt; and a step for performing the third level search if the estimated time to perform the third level search on the number of space vehicles in the second set does not exceed the maximum time remaining in the position fix attempt.

12. The method of claim 7, wherein the first set comprises space vehicles used in the first level search that exceed a first noise threshold, the second set comprises space vehicles that are likely visible to the wireless subscriber station and excludes space vehicles used in the first level search that exceed a second noise threshold, and the second noise threshold is stronger than the first noise threshold.

13. A non-transitory memory embodying executable instructions that enable a processor and correlator to:
perform a first level search associated with a first integration period as part of a position fix attempt;
derive one or more measurements from the ensuing search results;
determine whether the measurements satisfy one or more selected measurement sufficiency criteria;
avoid additional searching within the position fix attempt if the measurements satisfy one or more selected measurement sufficiency criteria; and
perform a higher level search beyond the first level search if the measurements do not satisfy the one or more selected measurement sufficiency criteria, wherein:
the higher level search is a second level search if a number of space vehicles in a first set exceeds a threshold number or an estimated time to perform a third level search on a number of space vehicles in a second set exceeds a maximum time remaining in the position fix attempt,
the higher level search is the third level search if the number of space vehicles in the first set does not exceed the threshold number and the estimated time to perform the third level search on the number of space vehicles in the second set does not exceed the maximum time remaining in the position fix attempt,
the second level search is associated with a second integration period that is longer than the first integration period,
the third level search is associated with a third integration period that is longer than the second integration period, and
the first, second and third integration periods function to provide each of the first, second and third level searches, respectively, with different levels of search sensitivity.

14. The memory of claim 13, wherein the executable instructions that enable the processor and the correlator to perform the higher level search further enable the processor and the correlator to:
compare the number of space vehicles in the first set to the threshold number if the wireless subscriber station determines that the measurements do not satisfy the one or more selected measurement sufficiency criteria; and
perform the second level search if the number of space vehicles in the first set exceeds the threshold number.

15. The memory of claim 14, wherein the executable instructions that enable the processor and the correlator to perform the higher level search further enable the processor and the correlator to:
compare the estimated time to perform the third level search on the number of space vehicles in the second set to the maximum time remaining in the position fix attempt if the number of space vehicles in the first set does not exceed the threshold number;
perform the second level search if the estimated time to perform the third level search on the number of space vehicles in the second set exceeds the maximum time remaining in the position fix attempt; and
perform the third level search if the estimated time to perform the third level search on the number of space vehicles in the second set does not exceed the maximum time remaining in the position fix attempt.

16. The memory of claim 13, wherein the first set comprises space vehicles used in the first level search that exceed a first noise threshold, the second set comprises space vehicles that are likely visible to the wireless subscriber station and excludes space vehicles used in the first level search that exceed a second noise threshold, and the second noise threshold is stronger than the first noise threshold.

17. A device including, a processor, a correlator, and a memory, wherein the processor is configured to access software instructions stored in the memory, the processor and correlator in combination for performing the software instructions, the memory embodying executable instructions to:
perform a first level search associated with a first integration period as part of a position fix attempt;
derive one or more measurements from the ensuing search results;
determine whether the measurements satisfy one or more selected measurement sufficiency criteria;
avoid additional searching within the position fix attempt if the measurements satisfy one or more selected measurement sufficiency criteria; and
perform a higher level search beyond the first level search if the measurements do not satisfy the one or more selected measurement sufficiency criteria, wherein:
the higher level search is a second level search if a number of space vehicles in a first set exceeds a threshold number or an estimated time to perform a third level search on a number of space vehicles in a second set exceeds a maximum time remaining in the position fix attempt,
the higher level search is the third level search if the number of space vehicles in the first set does not exceed the threshold number and the estimated time to perform the third level search on the number of space vehicles in the second set does not exceed the maximum time remaining in the position fix attempt,
the second level search is associated with a second integration period that is longer than the first integration period,
the third level search is associated with a third integration period that is longer than the second integration period, and
the first, second and third integration periods function to provide each of the first, second and third level searches, respectively, with different levels of search sensitivity.

18. The device of claim 17, wherein the executable instructions to perform the higher level search comprises executable instructions to:
compare the number of space vehicles in the first set to the threshold number if the wireless subscriber station determines that the measurements do not satisfy the one or more selected measurement sufficiency criteria; and
perform the second level search if the number of space vehicles in the first set exceeds the threshold number.

19. The device of claim 18, wherein the executable instructions to perform the higher level search further comprises executable instructions to:
compare the estimated time to perform the third level search on the number of space vehicles in the second set to the maximum time remaining in the position fix attempt if the number of space vehicles in the first set does not exceed the threshold number;

perform the second level search if the estimated time to perform the third level search on the number of space vehicles in the second set exceeds the maximum time remaining in the position fix attempt; and perform the third level search if the estimated time to perform the third level search on the number of space vehicles in the second set does not exceed the maximum time remaining in the position fix attempt.

20. The device of claim 17, wherein the first set comprises space vehicles used in the first level search that exceed a first noise threshold, the second set comprises space vehicles that are likely visible to the wireless subscriber station and excludes space vehicles used in the first level search that exceed a second noise threshold, and the second noise threshold is stronger than the first noise threshold.

21. A non-transitory device including memory embodying executable instructions that enable a processor and correlator to search for position determination signals using a plurality of progressively more sensitive search modes with sensitivity levels that are characterized by their respective integration periods and which plurality comprises, in order of increasing sensitivity, a first level mode, a second level mode, and a third level mode, comprising:

means for performing a first level search associated with a first integration period as part of a position fix attempt;

means for deriving one or more measurements from the ensuing search results;

means for determining whether the measurements satisfy one or more selected measurement sufficiency criteria;

means for avoiding additional searching within the position fix attempt if the measurements satisfy the one or more selected measurement sufficiency criteria; and means for performing a higher level search beyond the first level search if the measurements do not satisfy the one or more selected measurement sufficiency criteria, wherein;

the higher level search is a second level search if a number of space vehicles in a first set exceeds a threshold number or an estimated time to perform a third level search on a number of space vehicles in a second set exceeds a maximum time remaining in the position fix attempt, the higher level search is the third level search if the number of space vehicles in the first set does not exceed the threshold number and the estimated time to perform the third level search on the number of space vehicles in the second set does not exceed the maximum time remaining in the position fix attempt, the second level search is associated with a second integration period that is longer than the first integration period, and the third level search is associated with a third integration period that is longer than the second integration period.

22. The device of claim 21 further comprising:

means for discarding those measurements from the higher level search which are determined to be cross-correlations of the measurements from the first level search.

23. The device of claim 22 wherein the means for discarding discards the measurements from the higher level search at run time in favor of other measurements which better represent a space vehicle.

24. The device of claim 21, wherein the means for performing the higher level search comprises:

means for comparing the number of space vehicles in the first set to the threshold number if the wireless subscriber station determines that the measurements do not satisfy the one or more selected measurement sufficiency criteria; and means for performing the second level search if the number of space vehicles in the first set exceeds the threshold number.

25. The device of claim 24, wherein the means for performing the higher level search further comprises:

means for comparing the estimated time to perform the third level search on the number of space vehicles in the second set to the maximum time remaining in the position fix attempt if the number of space vehicles in the first set does not exceed the threshold number;

means for performing the second level search if the estimated time to perform the third level search on the number of space vehicles in the second set exceeds the maximum time remaining in the position fix attempt; and means for performing the third level search if the estimated time to perform the third level search on the number of space vehicles in the second set does not exceed the maximum time remaining in the position fix attempt.

26. The device of claim 21, wherein the first set comprises space vehicles used in the first level search that exceed a first noise threshold, the second set comprises space vehicles that are likely visible to the wireless subscriber station and excludes space vehicles used in the first level search that exceed a second noise threshold, and the second noise threshold is stronger than the first noise threshold.

* * * * *